United States Patent [19]

Peek et al.

[11] Patent Number: 5,018,299
[45] Date of Patent: May 28, 1991

[54] PESTICIDE DELIVERY DEVICE

[75] Inventors: Thomas W. Peek; John B. Floyd, both of Ocala, Fla.

[73] Assignee: BioAgriTech, Inc., a Florida corporation, Jacksonville, Fla.

[21] Appl. No.: 423,931

[22] Filed: Oct. 19, 1989

[51] Int. Cl.[5] .............................................. A01M 1/20
[52] U.S. Cl. ..................................... 43/107; 43/132.1; 43/131
[58] Field of Search ................. 43/107, 114, 115, 122, 43/132.1, 131

[56] References Cited

U.S. PATENT DOCUMENTS

| | | | |
|---|---|---|---|
| 3,708,908 | 1/1973 | Levey | 43/114 |
| 4,551,941 | 11/1985 | Schneidmiller | 43/107 |
| 4,718,193 | 1/1988 | Rosselli | 43/122 |
| 4,802,303 | 2/1989 | Floyd | 43/114 |

Primary Examiner—Kurt Rowan
Attorney, Agent, or Firm—Thomas C. Saitta

[57] ABSTRACT

A device for attracting and killing flies, the device being an elongated, absorbent member impregnated with a pesticide. The elongated member is preferably a piece of yarn approximately 16 to 18 inches in length. Artificial fly decoys made of short segments of yarn and impregnated with an attractant are affixed to the elongated member. The elongated member is attached on the ceiling or inside the roof of a building by attachment means such as a tack, magnet or adhesive. The attractant and the decoys cause flies to land on the elongated member where they are killed by the pesticide.

11 Claims, 1 Drawing Sheet

PESTICIDE DELIVERY DEVICE

BACKGROUND OF THE INVENTION

This invention deals generally with the field of devices which contain a pesticide for eradicating insects, and more specifically with the field of devices which attract flying insects to the pesticide.

It is well known that flies cause numerous problems by spreading bacteria and disease organisms. These problems are encountered in the living environments of both humans and animals. For example, the problems encountered in horse stables or barns are extreme, since the barns are concentrated sources of natural attractants for the flies. The diseases and parasites spread by flies can cause serious illness or even death in the animals. Horses represent significant investments, and much research has gone into development of systems to eradicate flies in this setting. It is necessary to protect the animals and humans from exposure to any pesticides used, so the delivery system must be designed with exposure concentrations and accessibility in mind. Because of the necessity to safely deliver any pesticide, the use of heavy spraying or saturation of objects or parts of the structure is not a good method. To this end, various traps and other types of contained delivery systems have been developed which have housings which are accessible to flies but not to the animals. These devices often are constructed with a number of components, usually an internal reservoir for the attractant and means to hold the poison surrounded by a housing with limited ingress means. For example, see U.S. Pat. Nos. 3,708,908 to Levey and 4,802,303 to Floyd. The basic method behind these traps is to use an attractant which diffuses through the air to attract the flies to a pesticide contained within the trap.

It is desirable to provide a pesticide delivery system utilizing an attractant for flies which is much simpler in construction than the traps described above. The device must not be less effective and must take into account the safety precautions involving exposure of the pesticide. It should also utilize knowledge of the natural habits of flies regarding feeding, sleeping and socializing.

BRIEF SUMMARY OF THE INVENTION

The invention comprises an elongated absorbent member, such as a piece of string or yarn, and a pesticide absorbed into this member. The elongated member has attachment means, such as a tack or magnet, for mounting the member from a structural member inside a building. Attached to the elongated member are artificial fly decoys. An attractant means is placed on the fly decoys.

DETAILED DESCRIPTION OF THE INVENTION

Studies of the behavior patterns of flies have revealed numerous insights into their inclinations regarding feeding, sleeping, socializing, etc. These discoveries are utilized in designing pesticide delivery systems and devices which will be highly effective. By incorporating this knowledge, the devices are more effective than simply dispersing pesticides with the hope that the flies will contact it and be killed. For example, it is known that flies prefer to feed on or near the ground, since this is where they find their food sources in nature. This fact is utilized in those devices which attract the flies to edible poisons. The devices are designed to be placed near ground level.

The present invention incorporates the knowledge gained from this type of research in several areas. It is known that at night, flies will seek the warm areas of buildings. In barns and stables, this will be up on the ceiling or in the rafters. The device is therefore constructed so as to be easily attachable in these areas. Another known fact is that flies prefer vertical surfaces to horizontal ones. The vertical surface is preferable for breeding behavior. Furthermore, it is known that flies prefer as open a view as possible to enable the fly to watch for predators or other danger. Using this knowledge, the device is constructed so as to provide a vertical surface with an optimum field of vision. Finally, it is known that flies are social insects and will be more easily attracted to a location where other flies are present. This is because the presence of other flies signals safety, a food source or the possibility of breeding.

Figure 1:
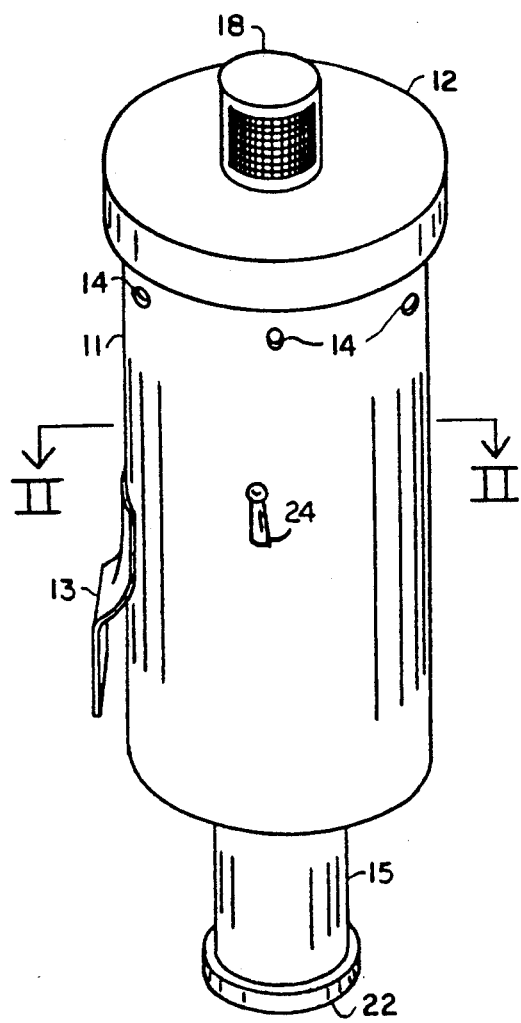
FIG. 1 is a view of the invention, where a tack is used as the means of attachment.

With reference now to FIG. 1, the device is seen to comprise an elongated member 1 attached to attachment means 2. The elongated member 1 may be attached to the attachment member 2 by adhesive or any other suitable means. Elongated member 1 is made of a flexible, absorbent material. Preferably, elongated member 1 is made from yarn. Other suitable materials are thick string, twine or cloth.

The elongated member 1 is preferably 16 to 18 inches in length. If it is significantly longer, any wind currents may entangle the elongated member 1 with other structural members, nails, etc. This results in the device not hanging in a vertical manner, which decreases the effectiveness of the invention. If the elongated member 1 is much shorter it is susceptible to increased wind movement and the amount of pesticide able to be incorporated in the device is decreased.

Any of the known pesticides which consist of liquids or wettable powders which can be absorbed by or adhered to the elongated member 1 are suitable for use with the invention. The elongated member 1 is soaked in a solution of the pesticide so that it is absorbed or adsorbed. Flies landing on the impregnated elongated member 1 will contact or eat the poison and die.

It is necessary to attract the flies to the device. This is accomplished by incorporating artificial fly decoys 4. The decoys 4 are preferably short segments of yarn which are tied or adhered to the elongated member 1. It has been found through experimentation that colors such as dark gray, red or black are the optimum colors for the decoys 4. Furthermore, yarn having silvery threads 6 intermingled with the main color perform the best, perhaps because the reflective threads appear as wings to the flies. The decoys 4 are impregnated or soaked with a known liquid attractant. The attractant may be made from naturally existing organic matter or may be a synthetic composition. The attractant disperses into the air and acts to draw the flies to the device. It has been found that the device is not effective using the attractant alone without the decoys 4.

Figure 2:
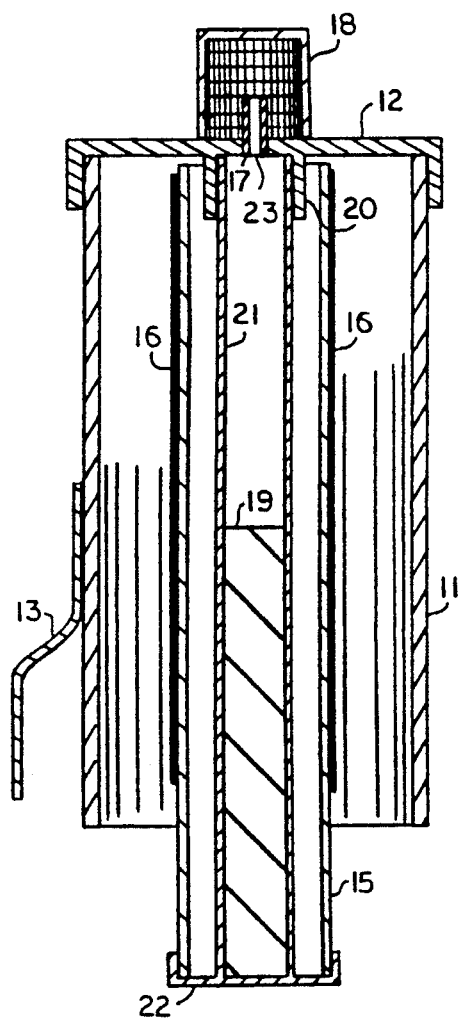
FIG. 2 is a partial view of the invention showing a magnet used as the means of attachment.

To utilize the device, attachment means 2 is affixed to a structural member in the ceiling or inside the roof of a building. Attachment means 2 can be a piece of adhesive material or any type of fastening element, such as a tack 3, or as shown in FIG. 2, a magnet 5, where the device is to be hung from a metallic object. The device is affixed such that the elongated member 1 hangs freely in open space, where it is easily visible to the flies and the attractant can be widely dispersed. The flies, sensing the attractant and observing the decoys 4 on the vertical surface, alight on the elongated member 1 where they are killed by the pesticide.

The above examples and illustrations are made for descriptive purposes and it will be obvious to those skilled in the art that substitutions and equivalents may be utilized. The full scope and definition of the invention therefore is to be as set forth in the following claims.

We claim:

1. A device for attracting and killing flies consisting essentially of:
   (A) pesticide means for killing the flies and attractant means for attracting the flies;
   (B) an elongated string-like, absorbent member impregnated with said pesticide means;
   (C) attachment means affixed to said elongated member, for attaching said elongated member to a structural member of a building, where said elongated member hangs vertically from said attachment means such that said elongated member is completely exposed;
   (D) one or more artificial decoys attached to said elongated member, where said decoys are impregnated with said attractant.

2. The device of claim 1, where said elongated member is flexible.

3. The device of claim 3, where said elongated member is made of yarn.

4. The device of claim 3, where said elongated member is made of string.

5. The device of claim 3, where said elongated member is made of cloth.

6. The device of claim 1, where said attachment means comprises a tack.

7. The device of claim 1, where said attachment means comprises a magnet.

8. The device of claim 1, where said attachment means comprises an adhesive.

9. The device of claim 1, where said decoys are short segments of yarn.

10. The device of claim 9, where said yarn contains silvery threads.

11. The device of claim 1, where said elongated member is approximately 16 to 18 inches in length.

* * * * *